(12) United States Patent
Jorgensen

(10) Patent No.: US 10,191,358 B2
(45) Date of Patent: Jan. 29, 2019

(54) MOVING HEAD PROJECTOR SYSTEM

(71) Applicant: Angela Jorgensen, Chicago, IL (US)

(72) Inventor: Angela Jorgensen, Chicago, IL (US)

(*) Notice: Subject to any disclaimer, the term of this patent is extended or adjusted under 35 U.S.C. 154(b) by 0 days.

(21) Appl. No.: 15/486,466

(22) Filed: Apr. 13, 2017

(65) Prior Publication Data

US 2017/0299952 A1 Oct. 19, 2017

Related U.S. Application Data

(60) Provisional application No. 62/321,806, filed on Apr. 13, 2016.

(51) Int. Cl.
| | |
|---|---|
| *G03B 21/14* | (2006.01) |
| *H04N 9/31* | (2006.01) |
| *G03B 17/56* | (2006.01) |
| *G03B 17/54* | (2006.01) |

(52) U.S. Cl.
CPC .......... *G03B 21/145* (2013.01); *G03B 17/54* (2013.01); *G03B 17/561* (2013.01); *H04N 9/3141* (2013.01)

(58) Field of Classification Search
CPC .... G03B 21/145; G03B 21/14; G03B 21/142; G03B 21/30; H04N 9/3141; H04N 9/3173
USPC ........................................................ 353/119
See application file for complete search history.

(56) References Cited

U.S. PATENT DOCUMENTS

| | | | |
|---|---|---|---|
| 7,197,562 B2 | 3/2007 | Murtha et al. | |
| 7,313,589 B2 | 12/2007 | Tran et al. | |
| 7,993,016 B2 | 8/2011 | Gao et al. | |
| 2003/0020881 A1* | 1/2003 | Jung | H04N 9/3141 353/30 |
| 2006/0256304 A1* | 11/2006 | Rodems | G03B 21/54 353/119 |
| 2010/0171936 A1* | 7/2010 | Plut | H04N 9/3141 353/61 |
| 2010/0188587 A1 | 7/2010 | Ashley et al. | |
| 2010/0262761 A1* | 10/2010 | Borchers | G06F 3/0613 711/103 |
| 2012/0062855 A1* | 3/2012 | Todoroki | H04N 9/3185 353/69 |
| 2012/0236265 A1* | 9/2012 | Watanabe | G03B 21/145 353/61 |
| 2013/0027442 A1* | 1/2013 | Jorgensen | F21S 10/007 345/690 |
| 2014/0139426 A1 | 5/2014 | Kryze et al. | |

* cited by examiner

*Primary Examiner* — Ryan D Howard
(74) *Attorney, Agent, or Firm* — Global Intellectual Property Agency, LLC; Daniel Boudwin

(57) ABSTRACT

A moving head projector. The moving head projector includes a projector housing that is rotatably mounted to a yoke, which is in turn rotatably mounted to a base. The yoke includes a motor configured to selectively move the projector housing along multiple axes. A projector is located within the projector housing and directed towards an opening on a front side of the projector housing, wherein a lens is also positioned over the opening. A computer within the base is configured to control the moving head projector. The computer further includes non-transitory memory configured for operating more than one operating system. In one embodiment, the moving head projector system includes a dual boot computer.

10 Claims, 4 Drawing Sheets

MOVING HEAD PROJECTOR SYSTEM

CROSS REFERENCE TO RELATED APPLICATION

This application claims the benefit of U.S. Provisional Application No. 62/321,806 filed on Apr. 13, 2016. The above identified patent application is herein incorporated by reference in its entirety to provide continuity of disclosure.

BACKGROUND OF THE INVENTION

Field of the Invention

The present invention relates to moving head projector systems. More specifically, the present invention provides a moving head projector system having a projector housing that is rotatably connected to a yoke that is adapted to adjust the projector housing along multiple axes. The moving head projector system includes a computer within a base, that is configured and compatible with different operating system such that a projector within the projector housing is controllable from various electronic devices.

Devices have been disclosed in the known art that relate to moving head projector systems. These include devices that have been patented and published in patent application publications. These devices in the known art have several known drawbacks. For example, these devices fail to provide a computer for controlling the projector being compatible with multiple operating systems.

In light of the devices disclosed in the known art, it is submitted that the present invention substantially diverges in design elements from the devices in the known art and consequently it is clear that there is a need in the art for an improvement to existing moving head projector systems. In this regard the instant invention substantially fulfills these needs.

SUMMARY OF THE INVENTION

In view of the foregoing disadvantages inherent in the known types of moving head projectors now present in the art, the present invention provides a new moving head projector system wherein the same can be utilized for providing convenience for the user when displaying images and controlling thereof from multiple remote devices running various types of operating systems.

It is therefore an object of the present invention to provide a new and improved moving head projector system having a projector within a projector housing that is rotatably connected to a yoke. The yoke includes motors for controlling the position and orientation along multiple axes thereof, such that a computer within the base directs the movement of the projector housing. The projector directs light through an opening of the projector housing and through a lens. The projector is supported by a shelf that is adjustably positioned within the projector housing.

It is another object of the present invention to provide a moving head projector system that is compatible with electronic devices running various operating systems.

Another object of the present invention is to provide a moving head projector system that Yet another object of the present invention is to provide a yoke comprising a pair of upstanding support arms disposed on opposing lateral sides of the projector housing, so as to provide a wide range of movement of the Another object of the present invention is to provide a moving head projector system that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
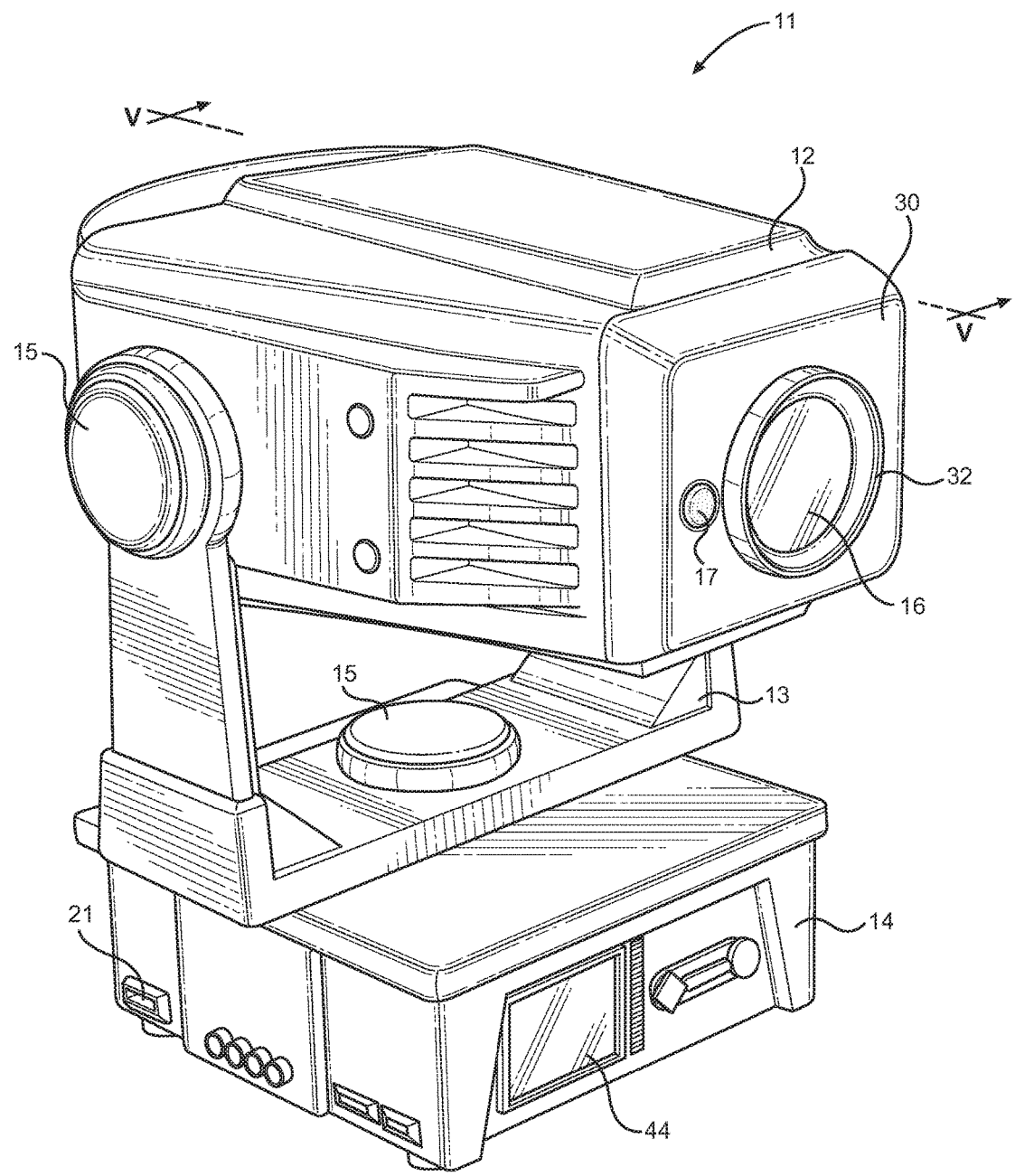
FIG. 1 shows a perspective view of the moving head projector system.

Reference is made herein to the attached drawings. Like reference numerals are used throughout the drawings to depict like or similar elements of the moving head projector system. For the purposes of presenting a brief and clear description of the present invention, the preferred embodiment will be discussed as used for projecting images onto a surface wherein the moving head projector is controllable via at least two remote controllers running different operating systems. The figures are intended for representative purposes only and should not be considered to be limiting in any respect.

Referring to FIG. 1, there is shown a perspective view of the moving head projector system. The moving head projector system 11 provides a projector for displaying light and images through a lens 16 onto a surface. The moving head projector system 11 further provides the ability to remotely control and adjust the projector. The moving head projector system 11 comprises a projector housing 12 rotatably mounted to a base 14 via a yoke 13. In the shown embodiment, the projector housing 12 houses a projector for emitting light therein. The yoke 13 including a motor 15 operably connected to the projector housing 12, wherein the motor 15 is configured to adjust a position and an orientation of the projector housing 12 along multiple axes. The projector disposed within the projector housing 12 is oriented towards an opening 32 disposed on a front side 30 of the projector housing 12. The lens 16 is positioned over the opening 32, such that the light from the projector passes through the lens 16 before leaving the projector housing 12.

A computer 44 disposed within the base 14 is configured to control the actuation of the motors 15 and the projector disposed within the projector housing 12. In one embodiment, a camera 17 is disposed on the projector housing 12. The camera 17 is adapted to capture images and store the captured images on non-transitory memory internal or external to the moving head projector system 11. In some embodiments, the front side of the projector housing includes a camera, such as a live-feed camera. In this manner, the projector is configured to project and display images onto a screen.

Figure 2:
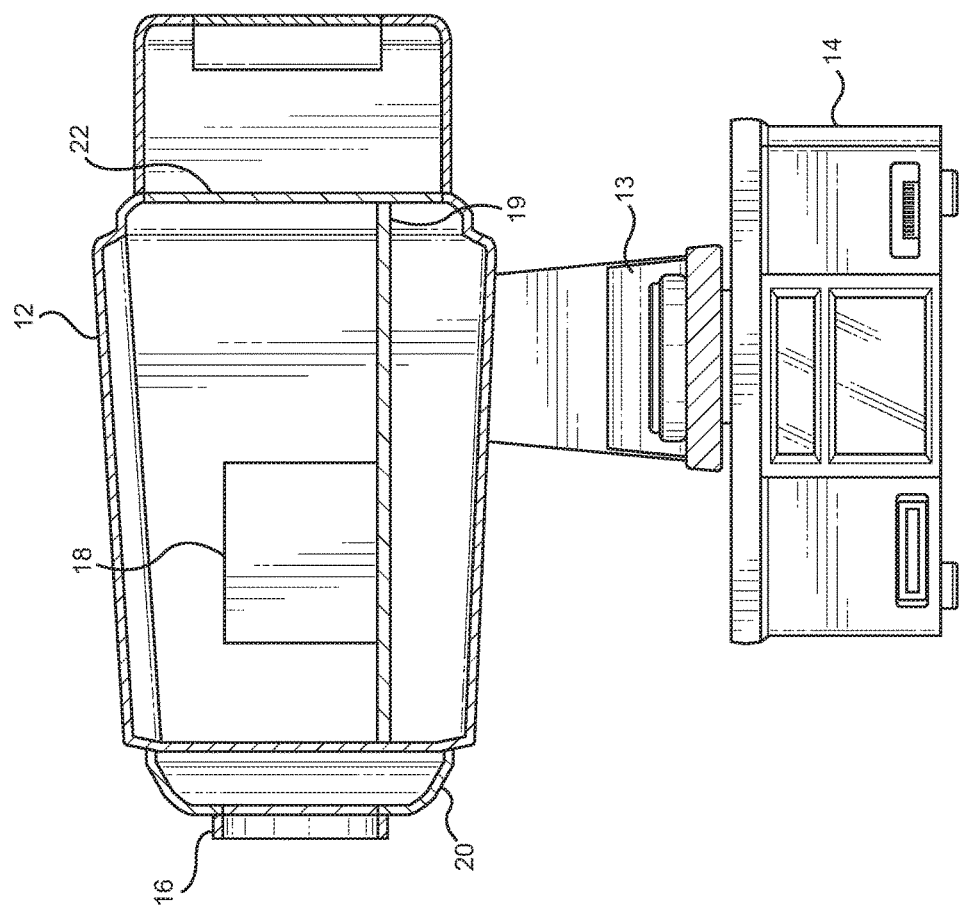
FIG. 2 shows a cross-sectional view of the moving head projector system taken along line V-V of FIG. 1.

Referring to FIG. 2, there is shown a cross-sectional view of the moving head projector system taken along line V-V of FIG. 1. The projector housing 12 includes a shelf 19 disposed within the projector housing 12, wherein the shelf 19 is configured to support the projector 18. The shelf 19 is adjustable along an interior side 22 of the projector housing 12. In the shown embodiment, the projector housing 12 includes a dowser 20 is removably disposed on the front side of the projector housing 12. The dowser 20 configured to selectively cover the lens and the opening of the projector housing 12. In the shown embodiment, the projector housing 12 has a rectangular cross section. In alternative embodiments, the projector housing 12 can be spherical or have any cross-sectional shape.

Figure 3:
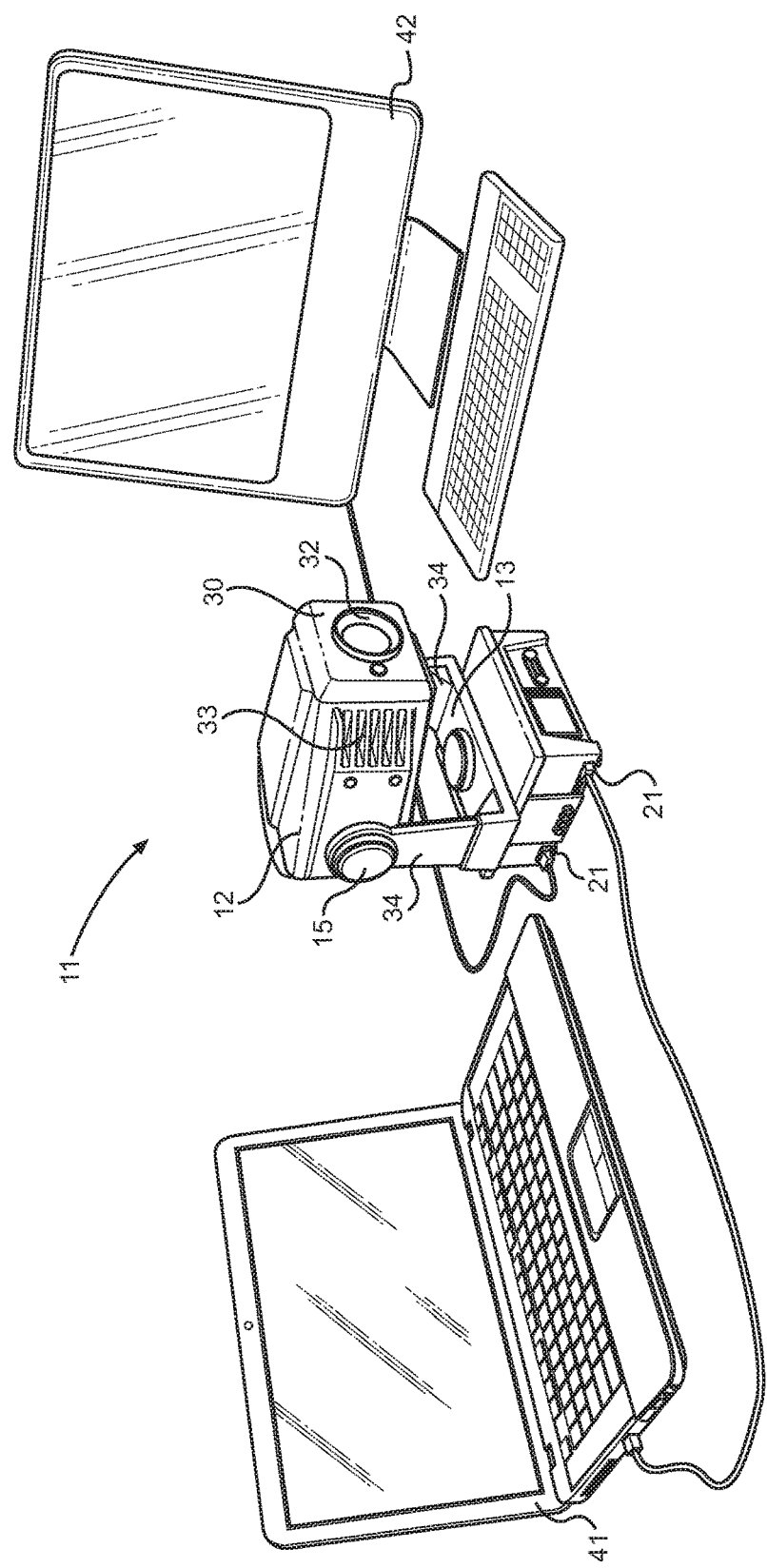
FIG. 3 shows a perspective view of the moving head projector system in one use.

Referring to FIG. 3, there is shown a perspective view of the moving head projector system in one use. In the shown embodiment, the yoke 13 further comprises a pair of upstanding support arms 34 disposed on opposing lateral sides of the projector housing 12. The yoke 13 comprises motors 15, a pair of motors operably connected to and disposed on the pair of upstanding support arms disposed on opposing lateral sides of the projector housing. The motors 15 are configured to rotate the projector housing 12 along a horizontal and vertical axis independent of each other. Further, a motor 15 is operably connected to the base 14 over a central area, in this way the yoke 13 and the coupled projector housing 12 are adapted to be rotated about the motor 15. A pair of electronic device 41, 42 are operably connected to the moving head projector system 11 at connectors 21. In one embodiment, the connectors 21 are USB connectors. However, in alternative embodiments, the connectors 21 are adaptor for coupling electronic devices. Further, in the shown embodiment, the pair of electronic device 41, 42 comprise different operating systems, and both 41, 42 are compatible with the moving head projector system 11. In one embodiment, the moving head projector system 11 includes a dual boot computer.

Figure 4:
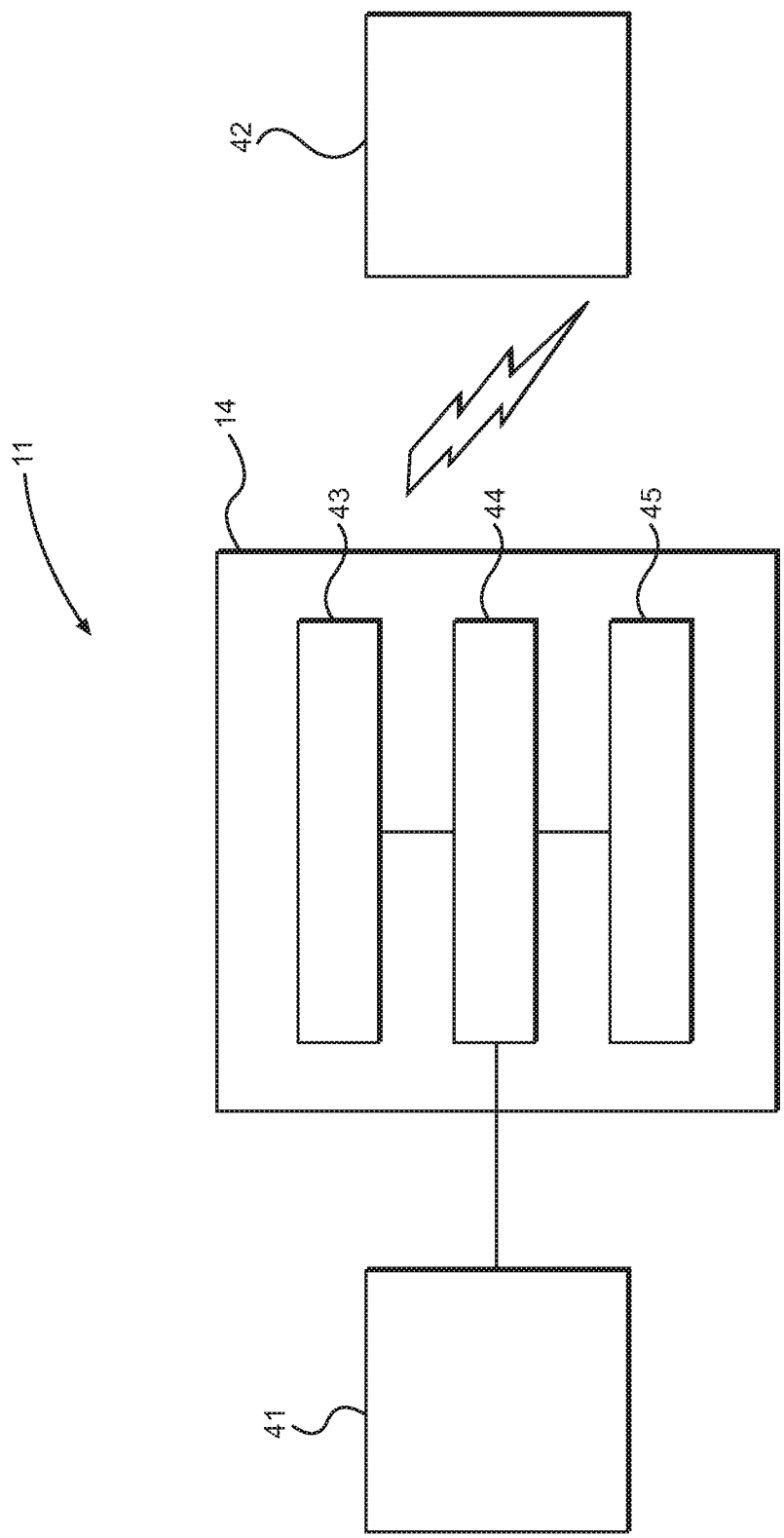
FIG. 4 shows a block diagram of the moving head projector system.

Referring to FIG. 4, there is shown a block diagram of the moving head projector system. The moving head projector system 11 includes a computer 44 (or processor) within the base 14 that is operably connected to a transceiver 43 for communicating with a remote controller or remote electronic device 41, 42 adapted to control the moving head projector system 11. The transceiver 43 is configured for wired or wireless communication. Additionally, the computer 44 includes non-transitory memory 45 for operating multiple operating systems, such that the moving head projector system 11 is compatible with various remote controllers and remote electronic devices. In this way, the moving head projector system 11 is adapted for use with various remote controllers and remote electronic devices wired or wirelessly.

In the shown embodiment, the moving head projector system 11 is in wired connection to a pair of electronic devices, wherein each of the pair of electronic devices include distinct operating systems. For example, a first electronic device of the pair of electronic devices runs a Mac operating system, and a second electronic device of the pair of electronic devices runs a Windows operating system. In this way, the computer of the moving head projector system 11 is compatible with both electronic devices, such that the projector and the motors are controllable from each of the electronic devices independently.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A moving head projector system, comprising:
a projector housing rotatably mounted to a base via a yoke;
the yoke including a motor configured to adjust a position and an orientation of the projector housing along multiple axes;
a projector disposed within the projector housing oriented towards an opening disposed on a front side of the projector housing;
a lens positioned over the opening; the lens configured to allow light from the projector to pass therethrough;
a computer disposed within the base, the computer configured to control the projector and the actuation of the motor;
a camera disposed on the front side of the projector housing adjacent the lens;
wherein the projector is configured to project a live-feed captured from the camera.

2. The moving head projector system of claim 1, wherein the computer includes a non-transitory memory, wherein the non-transitory memory is configured for operating more than one operating system.

3. The moving head projector system of claim 2, wherein the computer includes a transceiver for communicating with a remote controller adapted to control the moving head projector system.

4. The moving head projector system of claim 1, wherein the yoke further comprises a pair of upstanding support arms disposed on opposing lateral sides of the projector housing.

5. The moving head projector system of claim 1, wherein the yoke comprises a pair of motors disposed on the pair of upstanding support arms disposed on opposing lateral sides of the projector housing.

6. The moving head projector system of claim 1, further comprising a dowser removably disposed on the front side of the projector housing; the dowser configured to selectively cover the opening.

7. The moving head projector system of claim 1, further comprising a shelf disposed within the projector housing and configured to support the projector.

8. The moving head projector system of claim 7, wherein the shelf is adjustable along an interior of the projector housing.

9. The moving head projector system of claim 1, wherein the projector housing comprises a rectangular cross-section.

10. The moving head projector system of claim 4, wherein:
- the front side of the projector housing extends from the pair of upstanding support arms a first distance;
- a back side of the projector housing extends from the pair of upstanding support arms a second distance;
- wherein the first distance is greater than the second distance.

\* \* \* \* \*